US010493970B2

United States Patent
Merkel et al.

(10) Patent No.: US 10,493,970 B2
(45) Date of Patent: Dec. 3, 2019

(54) METHOD AND DEVICE FOR CONTROLLING AN AIR DRYER UNIT OF AN AIR SUPPLY SYSTEM FOR PRIMARY AND AUXILIARY AIR SUPPLY, IN PARTICULAR FOR A RAIL VEHICLE

(71) Applicant: KNORR-BREMSE SYSTEME FÜR SCHIENENFAHRZEUGE GMBH, Munich (DE)

(72) Inventors: Thomas Merkel, Hürth (DE); Peter Berger, Unterschleissheim (DE); Gert Assmann, Munich (DE); Christian Urra, Munich (DE); Angelicka Riedi, Munich (DE); Philipp Gehrke, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 75 days.

(21) Appl. No.: 15/758,984

(22) PCT Filed: Sep. 6, 2016

(86) PCT No.: PCT/EP2016/070902
§ 371 (c)(1),
(2) Date: Mar. 9, 2018

(87) PCT Pub. No.: WO2017/042140
PCT Pub. Date: Mar. 16, 2017

(65) Prior Publication Data
US 2018/0257628 A1 Sep. 13, 2018

(30) Foreign Application Priority Data
Sep. 11, 2015 (DE) .......................... 10 2015 115 368

(51) Int. Cl.
*B60T 17/02* (2006.01)
*B60T 17/00* (2006.01)
(Continued)

(52) U.S. Cl.
CPC ............ *B60T 17/004* (2013.01); *B01D 53/26* (2013.01); *B60T 17/02* (2013.01); *F15B 21/048* (2013.01);
(Continued)

(58) Field of Classification Search
CPC .... B01D 53/26; B01D 53/261; B01D 53/268; B01D 2259/4566; B60T 17/004;
(Continued)

(56) References Cited

U.S. PATENT DOCUMENTS 6,785,980 B1 * 9/2004 Koelzer ................ B60T 17/004
34/218
8,529,660 B2 9/2013 Diekmeyer et al.
(Continued)

FOREIGN PATENT DOCUMENTS

DE 10344153 A1 4/2005
DE 10338162 B3 6/2005
(Continued)

OTHER PUBLICATIONS

Search Report for International Patent Application No. PCT/EP2016/070902; dated Nov. 22, 2016.
(Continued)

*Primary Examiner* — Frank M Lawrence, Jr.
(74) *Attorney, Agent, or Firm* — Barnes & Thornburg LLP

(57) ABSTRACT

A method and device control at least one air dryer unit of an air supply system for the primary and auxiliary air supply of a vehicle. In the method and device, at least one compressor is driven by an associated electric motor that serves both for
(Continued)

the primary air supply of a primary air tank and for the auxiliary air supply of an auxiliary air tank. Compressed air generated by the compressor is channeled over the at least one downstream air dryer unit so as to dry the compressed air generated by the compressor while the drying agent of the air dryer is regenerated with dried compressed air. During the auxiliary air supply, the air flow used for regenerating the at least one air dryer unit is reduced or suppressed.

12 Claims, 2 Drawing Sheets

(51) Int. Cl.
*F15B 21/048* (2019.01)
*B01D 53/26* (2006.01)

(52) U.S. Cl.
CPC .......... *B01D 53/261* (2013.01); *B01D 53/268* (2013.01); *B01D 2259/4566* (2013.01); *F15B 2211/655* (2013.01); *F15B 2211/7142* (2013.01); *F15B 2211/80* (2013.01)

(58) Field of Classification Search
CPC .. B60T 17/02; F15B 21/048; F15B 2211/655; F15B 2211/7142; F15B 2211/80
USPC ... 95/1, 19, 21, 52, 117, 118, 119, 121, 122; 96/4, 113, 121, 130, 131; 34/80, 472, 34/473
See application file for complete search history.

(56) References Cited

U.S. PATENT DOCUMENTS

| | | | |
|---|---|---|---|
| 9,333,459 B2 | 5/2016 | Urra et al. | |
| 2003/0183077 A1* | 10/2003 | Hoffman | B60T 17/004 95/21 |
| 2015/0251646 A1* | 9/2015 | Eberling | B60T 17/004 95/21 |
| 2016/0221447 A1 | 8/2016 | Urra et al. | |

FOREIGN PATENT DOCUMENTS

| | | |
|---|---|---|
| DE | 102006048071 A1 | 4/2008 |
| DE | 102008056322 A1 | 5/2010 |
| DE | 102010024059 A1 | 12/2011 |
| DE | 102013109475 A1 | 3/2015 |
| EP | 1508488 A1 | 2/2005 |
| JP | 2010506801 A | 3/2010 |
| JP | 2016534870 A | 11/2016 |
| WO | 9943527 A1 | 2/1999 |
| WO | 2013150110 | 10/2013 |

OTHER PUBLICATIONS

Japanese Office Action corresponding to JP2018-52952; dated May 22, 2019.

* cited by examiner

METHOD AND DEVICE FOR CONTROLLING AN AIR DRYER UNIT OF AN AIR SUPPLY SYSTEM FOR PRIMARY AND AUXILIARY AIR SUPPLY, IN PARTICULAR FOR A RAIL VEHICLE

CROSS-REFERENCE AND PRIORITY CLAIM

This patent application is a U.S. National Phase of International Patent Application No. PCT/EP2016/070902, filed Sep. 6, 2016, which claims priority to German Patent Application No. 10 2015 115 368.8, filed Sep. 11, 2015, the disclosures of which are incorporated herein by reference in their entirety.

FIELD

Disclosed embodiments relate to a method and a device for controlling at least one air drier unit of an air supply system for the primary and auxiliary air supply of a vehicle, in particular a rail vehicle, in which both the primary air supply of a primary air vessel and the auxiliary air supply of an auxiliary air vessel is implemented via at least one compressor which is driven via an assigned electric motor, wherein the compressed air which is generated by the compressor is conducted via the at least one downstream air drier unit with which the compressed air which is generated by the compressor is dried, wherein the drying agent used depending on the type of air drier unit is regenerated with dried compressed air.

SUMMARY

It is disadvantageous in the conventional prior art that during auxiliary air supply, which may serve predominantly to refill the auxiliary air vessel, dried compressed air is also consumed for regenerating the air drier unit. As a result, the refilling of the auxiliary air vessel is delayed, in particular when this takes place within the scope of the upgrading of a rail vehicle with a pantograph power supply, because the time period for bringing about the operational readiness of the vehicle, that is to say the extension of the pantograph, is delayed further in the case of a battery-operated auxiliary air supply.

Disclosed embodiments provide a method and a device for controlling an air drier unit of an air supply system for the primary and auxiliary air supply of a vehicle, which method and device permit prompt supply of auxiliary air, and therefore rapid upgrading of a vehicle, with simple technical means.

Disclosed embodiments include the technical teaching that during the auxiliary air supply the air flow used for regenerating the at least one air drier unit is reduced or entirely suppressed, with the result that, during the auxiliary air supply, a higher volume flow in comparison with the primary air supply, or the total volume flow which is delivered by the compressor is available for filling the auxiliary air vessel.

Accordingly, during the auxiliary air supply, the air drier unit at least reduces a regeneration of drying agent with simple measures in terms of control technology, so that the dried compressed air which is saved as a result can be added to the auxiliary air supply. As a result, the upgrading of the vehicle is significantly shortened compared to the prior art, and the vehicle is operationally ready more quickly.

BRIEF DESCRIPTION OF THE FIGURES

Further measures which improve disclosed embodiments are presented in more detail together with the description of exemplary embodiments on the basis of the figures, in which.

DETAILED DESCRIPTION

Figure 1:
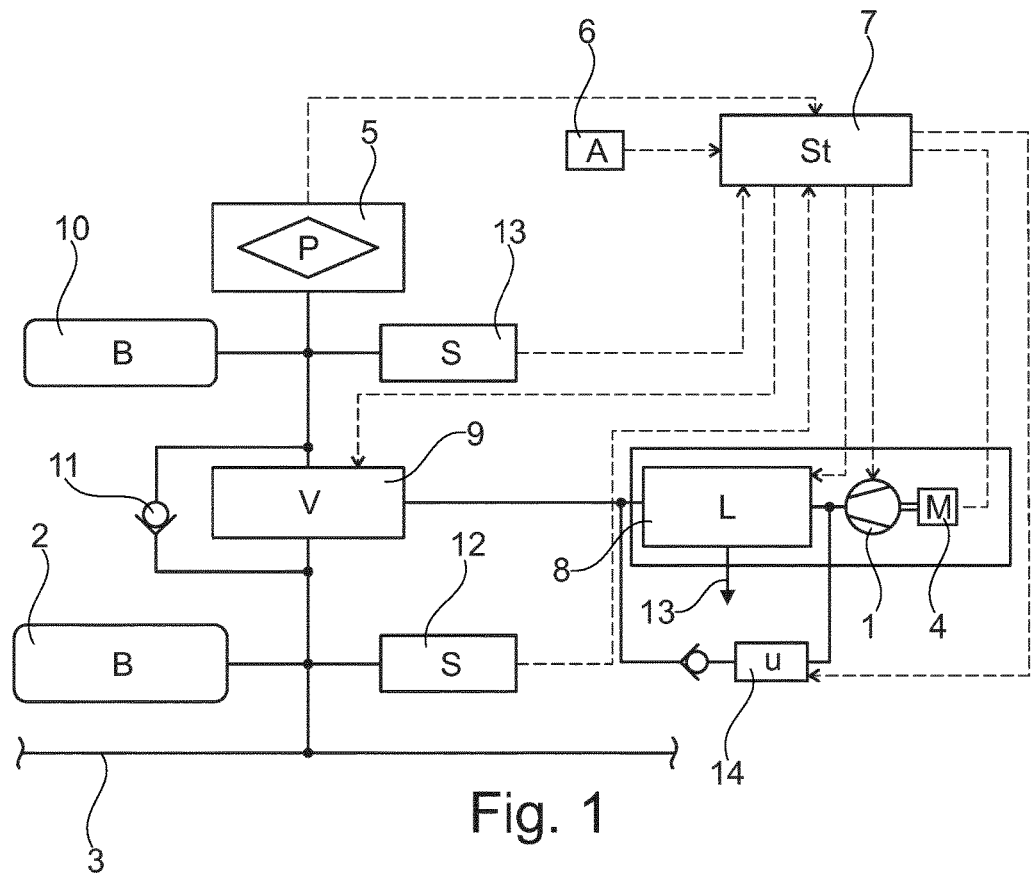
FIG. 1 shows a schematic block diagram of a device for controlling an air drier unit of an air supply system for the primary and auxiliary air supply with a backflow function.

The field of use of disclosed embodiments extends predominantly to the construction of rail vehicles. In such equipment, the compressor, which is driven in this respect by an electric motor, generates compressed air which is used to supply pneumatic assemblies such as, for example, a vehicle brake system. For this purpose, the compressed air, which is generated from the ambient air by the compressor, is firstly to be fed to an air drier unit, which largely extracts the moisture from the compressed air.

In addition to such a primary air supply, according to the generally known prior art, a separate auxiliary air compressor, which is operated by a vehicle battery, can be used to implement an auxiliary air supply. The auxiliary air supply can make available the necessary pneumatic energy for the actuator drive of a pantograph or the like. In the extended state a pantograph provides an electrical energy supply for the vehicle via an overhead electrical line. The pneumatic actuator drive moves the pantograph between the extended position and a retracted position in which the electric overhead line contact is interrupted.

In order to upgrade the vehicle, that is in order to bring about the operational readiness by, inter alia, bringing about the electrical overhead line contact, the separate auxiliary air compressor is supplied with electrical energy via the vehicle battery of the vehicle, and has a relatively low delivery capacity. The electrical energy of the vehicle battery is sufficient here to drive the auxiliary air compressor by electric motor, with the result that in this way sufficient compressed air can be generated for the auxiliary air supply.

DE 10 2013 109 475 A1 discloses another technical solution in which such a separate auxiliary air compressor can be dispensed with, since the function thereof is also performed by the primary compressor of the vehicle. For the auxiliary air supply via the compressor, the driving electric motor thereof is operated with the electrical energy which is made available by the vehicle battery via a frequency converter. The drive energy which is generated in this way is sufficient to operate the primary compressor with a relatively low rotational speed, and the compressed air for the auxiliary air supply is branched off from a secondary line of the compressed air feed line to the primary air vessel. This branching off of the auxiliary air takes place downstream of the air drier unit which is connected downstream of the primary compressor, so that dried auxiliary air is available.

Conventional air drier unit of the prior art are embodied as adsorption air driers, wherein a two-chamber drier includes two air drier cartridges which can be operated in parallel, are filled with a drying agent and can be operated alternately in a drying phase and a regeneration phase in a generally known fashion. Because of this, part of the dried compressed air is always consumed for the purpose of regeneration.

However, conventional air drier units can alternatively also be embodied as a diaphragm air drier, wherein the drier operates by via diffusion and is composed of a large number of hollow fibers, which run parallel to one another in the longitudinal direction. The drying compressed air flows through these fibers in the longitudinal direction. As a result of the specific design and the material properties of the hollow fibers, water can penetrate their sidewalls more quickly than air.

The concentration gradient of air moisture between the interior of the hollow fibers and their surroundings gives rise to the diffusion of the water which is extracted from the air moisture, from the interior of the fiber to the exterior of the fiber. The condensate is then conducted away there. The regeneration of the drying agents which are embodied here as hollow fibers takes place using already dried compressed air which is guided along the outside of the hollow fibers in the counterflow direction. Dried compressed air is also consumed for this; as a result, the compressed air can no longer be available for the primary air flow.

WO 2013/150110 discloses another conventional, adsorption air drier with two air drier cartridges which are connected in parallel with one another and can be operated alternately in the drying mode and regeneration mode. Here, a regeneration line is provided via which dried compressed air can be fed back again to the input side of the absorption air drier while bypassing at least one of the air drier cartridges, whereby regeneration.

It is disadvantageous in the prior art that, during the auxiliary air supply, which serves predominantly to refill the auxiliary air vessel, dried compressed air is also consumed for regenerating the air drier unit. As a result, the refilling of the auxiliary air vessel is delayed, in particular when this takes place within the scope of the upgrading of a rail vehicle with a pantograph power supply, because the time period for bringing about the operational readiness of the vehicle, that is to say the extension of the pantograph, is delayed further in the case of a battery-operated auxiliary air supply.

Thus, disclosed embodiments provide a method and a device for controlling an air drier unit of an air supply system for the primary and auxiliary air supply of a vehicle, which method and device permit prompt supply of auxiliary air, and therefore rapid upgrading of a vehicle, with simple technical means.

In accordance with at least one embodiment, after the at least one compressor of the air supply system has been switched off, dried compressed air is conducted from a primary air vessel, which is provided within the scope of the primary air supply, and/or the auxiliary air vessel through the at least one air drier unit in order to regenerate the drying agent. In other words, after the air supply system has been switched off, it is ensured, by emptying the vessel via the air drier unit, that the vehicle is shutdown with sufficiently regenerated drying agent.

When the vehicle is re-activated and the upgrading which is associated therewith occurs, the initial battery-operated auxiliary air supply with dried compressed air can be ensured via the air drier unit even though in this phase regeneration of the drying agent is suppressed. This measure in terms of control technology can easily be implemented via an intelligent switching device which, after the air supply system has been switched off when the vehicle is shut down, at least partially consumes the stored dried compressed air for the regeneration of the air dryer unit.

For this purpose, for example the switching device feeds back the compressed air from the primary air vessel upstream of the air drier unit when the air supply system has been deactivated. The air drier unit should be embodied in such a way that after the drying interval it automatically switches off the consumption of compressed air, in order to save compressed air. Therefore, when upgrading next occurs, sufficient compressed air can possibly still be present in the primary air vessel, with the result that even filling of the auxiliary air vessel by the compressor can, under certain circumstances, also be omitted.

The shutting down of the air drier unit in the thoroughly dried state can, as an alternative to this, also be implemented by run-on control of the compressor. In this context, the compressor would be operated for longer than would be necessary to fill the vessels. The drying effect can be optimized by adapting the actuation parameters of the air drier unit in this phase.

Switching over the at least one air drier unit into the phase of the auxiliary air supply is optionally carried out as a function of the pressure in the auxiliary air vessel. The switching over can take place here in a mechanical, pneumatic, electrical or hydraulic fashion.

According to one alternative embodiment of the disclosed embodiments, a plurality of compressors optionally with different delivery capacities can also be used for the primary air supply and auxiliary air supply, wherein in the phase of the auxiliary air supply a compressor or some of the compressors with a relatively low delivery capacity is/are operated via the vehicle battery in particular in order to upgrade the vehicle. In other words, in this context a plurality of compressors which are connected in parallel fill the primary air vessel and the auxiliary air vessel via at least one air drier unit. If, optionally, only a single compressor with a relatively low delivery capacity is used for the auxiliary air supply here, this requires less electrical power which has to be extracted from the vehicle battery. This saves the vehicle battery.

According to another alternative embodiment of the disclosed embodiments, it is proposed that the air supply system comprises a plurality of air drier units which are connected in parallel with one another. Within the scope of this parallel connection, at least one valve is provided for activating one of the air drier units or a subset of the air drier units in the phase of the auxiliary air supply. However, it is also additionally conceivable to connect a plurality of air drier units in series with one another, wherein at least one valve is also provided here for activating at least one of the air drier units in the phase of the auxiliary air supply. It is to be noted that any air drier unit can also be combined with one or more pre-filters or condensate precipitators to form one structural unit. If one of a plurality of air drier units for the auxiliary air supply, or a partial selection of the air drier units, is activated, the drying demand can be adapted to the volume flow for the filling of the auxiliary air vessel.

In all the embodiment variants which are explained above and those which are also conceivable, a control unit ensures, by actuating corresponding valves, that during the auxiliary air supply, in particular during the upgrading of the vehicle, regeneration of the drying agent is reduced or suppressed, and in this context optionally only a single air drier unit is actuated.

The control unit may be, optionally, embodied as an electronic control unit, and the valves which are actuated thereby for implementing the control according to disclosed embodiments may be embodied as electro-pneumatic valves. However, it is also conceivable that the control can be carried out in a mechanical, pneumatic or hydraulic fashion.

According to FIG. 1, a compressor 1 for generating compressed air for filling a primary air vessel 2 and a primary air vessel line 3 connected thereto is provided within the scope of a primary and auxiliary air supply of a rail vehicle which is operated electrically (not illustrated in more detail). The compressor 1 is driven by an electric motor 4. The electrical energy for driving the electric motor 4 is drawn via a pantograph 5 through an overhead line connection during the normal operation of the rail vehicle. A vehicle battery 6 which is arranged onboard the vehicle serves for a further electrical energy supply. The electrical energy supply via the pantograph 5 and vehicle battery 6 is controlled via an electronic control unit 7 (dashed lines) which also contains, inter alia, an integrated inverter for varying the voltage and frequency for driving the electric motor 4, the inverter being embodied here as a three-phase motor.

A pneumatic actuator drive which is assigned to the pantograph 5 is operated in order to retract and extend the pantograph 5 with the compressed air which is generated by the compressor 1 and dried via an air drier unit 8. Since in the phase of upgrading the vehicle in which the pantograph 5 is still located in the retracted position of rest, no electrical energy is available from the overhead line, the electric motor 4 of the compressor 1 is initially supplied with electrical energy via the vehicle battery 6. The electrical energy which can be provided by the vehicle battery 6 is sufficient in this phase of upgrading the vehicle to operate the compressor 1 with a low delivery capacity, which is sufficient to fill the primary air vessel 10 and subsequently extend the pantograph 5 via its pneumatic actuator drive.

For this purpose, the compressed air which is generated by battery operation of the compressor 1 is fed to an auxiliary air vessel 10 in accordance with the electronic control unit 7, via a switching valve 9 which is embodied here an as electropneumatic 3/2-way valve. The auxiliary air vessel 10 stores the compressed air to drive the pantograph 5. Outside the phase of upgrading the vehicle, the switching valve 9 feeds the compressed air which has been generated by the compressor 1 and dried via the air drier unit 8 to the primary air vessel 2 of the vehicle. The filling of the primary air vessel 2 optionally takes place during the normal operation of the vehicle with an electrical energy supply via the pantograph 5.

If there is still sufficient compressed air in the primary air vessel 2 at the time when the vehicle is upgraded, an emptied auxiliary air vessel 10 can also be filled therefrom. For this purpose, a non-return valve 11, which is connected in parallel with the switching valve 9 and has a forward flow direction from the primary air vessel 2 to the auxiliary air vessel 10 is provided.

The electronic control unit 7 predefines the electrical switching signal (dotted line) to the electropneumatic switching valve 9, in order to implement the primary or auxiliary air supply of the vehicle in accordance with the logic explained above. A pressure signal of a first pressure sensor 12 at the primary air vessel 2 and of a second pressure sensor 13 at the auxiliary air vessel 10 (dotted lines) is fed to the electronic control unit 7 on the signal input side. The electronic control unit 7 determines from the pressure signal the switching signal for the electropneumatic switching valve 9 in accordance with the logic explained above. Furthermore, the electronic control unit 7 performs the actuation of the compressor 1 and also the actuation of the air drier unit 8 in terms of the drying mode and regeneration mode (dotted lines).

With respect to the switching valve 9, in a first switched position of the 3/2-way valve the feed pressure which is generated by the compressor 1 is fed to the auxiliary air vessel 10—in particular in the phase of the upgrading of the vehicle—and in a second switched position the feed pressure which is generated by the compressor 1 is fed to the primary air vessel 2, in order to ensure the primary air supply of the vehicle.

Furthermore, during the auxiliary air supply the electronic control unit 7 inventively suppresses or reduces the air flow which is used to regenerate the air drier unit 8. As a result of this, in comparison with the phase of the primary air supply, the total volume flow, or a relatively high portion of the volume flow, delivered by the compressor 1, is available for filling the auxiliary air vessel 10 during the phase of the auxiliary air supply, and no regeneration air, or less regeneration air, passes to the surroundings via an outlet which is provided for this purpose.

Within the scope of a backflow function, in the switched-off state of the compressor 1, a switching valve 14 which is actuated via the electronic control unit conducts dried compressed air from the primary air vessel 2 or the auxiliary air vessel 10 through the air drier unit 8 in order to regenerate the drying agent contained therein, after the air supply system is shut down. The consumed compressed air passes from the outlet on the air drier unit 8 to the surroundings.

Figure 2:
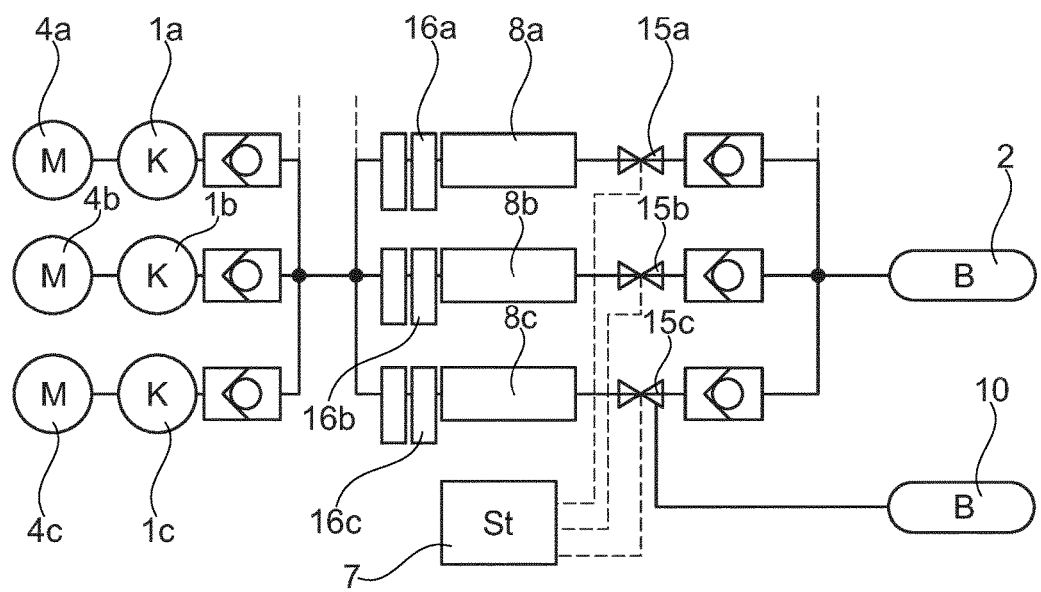
FIG. 2 shows a schematic block circuit diagram illustration of part of the air supply system with a plurality of air drier units which are connected in parallel with one another.

The further exemplary embodiment which is illustrated in FIG. 2 concentrates on the area of the generation and drying of compressed air for the primary and auxiliary air supply by filling the primary air vessel 2 and the auxiliary air vessel 10. In this exemplary embodiment, in contrast to the exemplary embodiment described above, a plurality of compressors 1a to 1c, each with an assigned electric motor 4a to 4c, are used for the primary and auxiliary air supply. However, in the phase of the auxiliary air supply for upgrading the vehicle, only a single compressor 1a is operated here via the vehicle battery 6 (not illustrated here in more detail), which makes available the electrical energy necessary for this to the electric motor 4a which is connected upstream.

In addition, the air supply system of this exemplary embodiment comprises a plurality of air drier units 8a to 8c which are connected in parallel with one another. Correspondingly assigned valves 15a to 15c activate the air drier units 8a to 8c in accordance with the electronic controller 7 (dotted line). A pre-filter 16a to 16c is assigned to each of the air drier units 8a to 8c.

Figure 3:
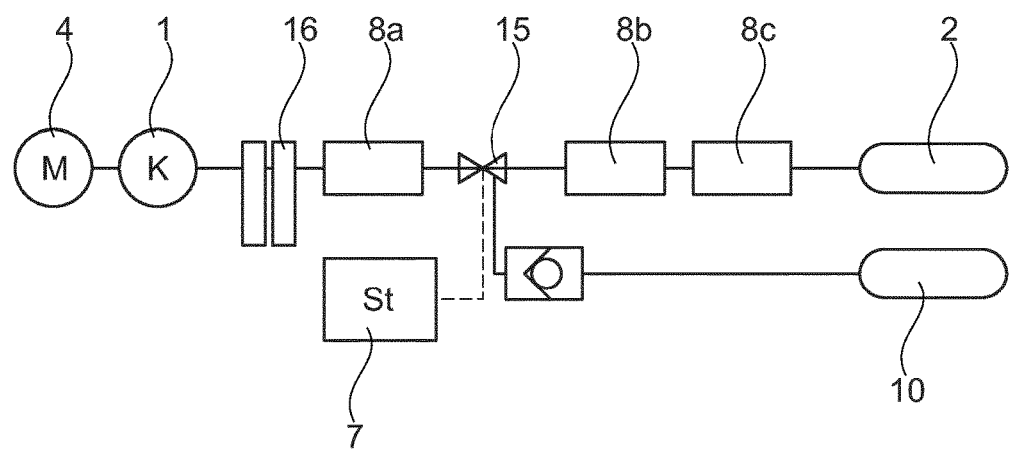
FIG. 3 shows a schematic block circuit diagram illustration of part of the air supply system with a plurality of air drier units which are connected in series.

In the exemplary embodiment, according to FIG. 3, in contrast to the exemplary embodiment described above, air drier units 8a to 8c are connected in series, in order to fill the primary air vessel 2 within the scope of a primary air supply. For this purpose, in this exemplary embodiment only one compressor 1 with an assigned electric motor 4 is used.

However, for the auxiliary air supply only the first air drier unit 8a of the series is used, after which the dried auxiliary air flow is branched off via the valve 15 in accordance with the controller 7. The auxiliary air serves to fill the auxiliary air vessel 10.

Disclosed embodiments are not limited to the exemplary embodiments described above. Instead, refinements thereof are also conceivable, the refinements also being included in the scope of protection of the following claims. It is therefore also possible, for example, that even in the case of the series connection of a plurality of air drier units a plurality of compressors can also be used for generating compressed air. Likewise, the valve 15 or 15*a* to 15*c* for activating the respectively assigned air drier unit 8; 8*a* to 8*c* can also be arranged upstream of the air drier units in the primary air flow direction. A non-return valve connection of the lines is provided at the location where a backflow of air from a vessel is to be prevented. The air drier units 8; 8*a* to 8*c* can be embodied as absorption air driers, diaphragm air driers or the like in so far as a regeneration mode via dried compressed air is provided here.

LIST OF REFERENCE NUMBERS

1 Compressor
2 Primary air vessel
3 Primary air vessel line
4 Electric motor
5 Pantograph
6 Vehicle battery
7 Control unit
8 Air drier unit
9 Switching valve
10 Primary air vessel
11 Non-return valve
12 Pressure sensor
13 Pressure sensor
14 Switching valve
15 Valve
16 Pre-filter

The invention claimed is:

1. A method for controlling at least one air drier unit of an air supply system for a primary and auxiliary air supply of a vehicle, in which both the primary air supply of a primary air vessel and the auxiliary air supply of an auxiliary air vessel are implemented by at least one compressor, wherein the method comprises:
   driving the at least one compressor by an assigned electric motor;
   generating compressed air by the compressor and by an at least downstream air drier unit;
   drying the generated compressed air; and
   regenerating a drying agent of the air drier unit with dried compressed air,
   wherein, during the auxiliary air supply, the air flow used for regenerating the at least one air drier unit is reduced or suppressed, whereby, during the auxiliary air supply, a higher volume flow is available for filling the auxiliary air vessel in comparison with the primary air supply, or the total volume flow which is delivered by the compressor is available for filling the auxiliary air vessel.

2. The method of claim 1, further comprising, after the at least one compressor has been switched off, conducting dry compressed air from the primary air vessel and/or the auxiliary air vessel through the at least one air drier unit to regenerate the drying agent.

3. The method of claim 1, further comprising switching over the at least one air drier unit into the phase of the auxiliary air supply is carried out as a function of the pressure in the auxiliary air vessel.

4. The method of claim 1, wherein, a plurality of compressors (1; 1*a*-1*c*) with different delivery capacities are used for the primary air supply and auxiliary air supply, further comprising, in the phase of the auxiliary air supply, operating a compressor with a relatively low delivery capacity via a vehicle battery to upgrade the vehicle.

5. The method of claim 1, further comprising, in the phase of the primary air supply, filling the primary air vessel with compressed air by the at least one compressor, whereby at least one pneumatic brake system is supplied with compressed air.

6. The method of claim 1 further comprising, in the phase of the auxiliary air supply, filling the auxiliary air vessel with compressed air by the at least one compressor, whereby a pneumatic actuator drive for activating a pantograph and/or primary switch is supplied with compressed air.

7. A device for controlling at least one air drier unit (8; 8*a*-8*c*) of an air supply system for a primary and auxiliary air supply of a vehicle, the device comprising:
   at least one compressor driven by an assigned electric motor, wherein the at least one compressor implements both the primary air supply of a primary air vessel and the auxiliary air supply of an auxiliary air vessel, wherein the generated compressed air flows via at least one downstream air drier unit which dries compressed air which is generated by the compressor, wherein the air drier unit regenerates drying agent of the air drier unit with dried compressed air, and
   wherein, during the auxiliary air supply, a control unit reduces or suppresses air flow which is used to regenerate the at least one air drier unit whereby, during the auxiliary air supply, a higher volume flow is available for filling the auxiliary air vessel in comparison with the primary air supply, or the total volume flow which is delivered by the compressor is available for filling the auxiliary air vessel.

8. The device of claim 7, wherein the air supply system comprises a plurality of air drier units connected in parallel with one another, wherein at least one valve is provided for activating one or some of the air drier units in a phase of the auxiliary air supply.

9. The device of claim 7, wherein the air supply system comprises a plurality of air drier units which are connected in series with one another, wherein at least one valve is provided for activating one of the air drier units in the phase of the auxiliary air supply.

10. The device of claim 7, wherein, in a switched-off state of the at least one compressor, the control unit conducts dry compressed air from the primary air vessel and/or the auxiliary air vessel via at least one switching valve to regenerate the drying agent of the air supply system by means of the at least one air drier unit.

11. The device of claim 7, wherein the air drier unit includes an adsorption air drier, the air drier cartridges of which being filled with drying agent, wherein the adsorption air drier is operable in the drying mode and regeneration mode.

12. The device of claim 7, wherein the air drier unit (8; 8*a*-8*c*) is embodied as a diaphragm air drier, the filtration diaphragms of which are operable as drying agents in a drying and regeneration mode.

* * * * *